US006816860B2

(12) United States Patent
Yamamoto

(10) Patent No.: US 6,816,860 B2
(45) Date of Patent: *Nov. 9, 2004

(54) DATABASE LOAD DISTRIBUTION PROCESSING METHOD AND RECORDING MEDIUM STORING A DATABASE LOAD DISTRIBUTION PROCESSING PROGRAM

(75) Inventor: Hiroshi Yamamoto, Tokyo (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/478,202

(22) Filed: Jan. 5, 2000

(65) Prior Publication Data

US 2003/0097370 A1 May 22, 2003

(30) Foreign Application Priority Data

Jan. 5, 1999 (JP) .......................................... 11-000422

(51) Int. Cl.[7] .............................................. G06F 17/30
(52) U.S. Cl. ....................... 707/10; 707/203; 707/204; 707/205
(58) Field of Search .................... 707/203, 200, 707/205, 10, 204; 709/200, 201, 204, 203

(56) References Cited

U.S. PATENT DOCUMENTS

| 4,897,781 A | * | 1/1990 | Chang et al. ................ 707/200 |
| 6,012,052 A | * | 1/2000 | Altschuler et al. ............. 707/2 |
| 6,185,601 B1 | * | 2/2001 | Wolff .......................... 709/203 |

* cited by examiner

Primary Examiner—Jean M. Corrielus
Assistant Examiner—Cam Y Truong
(74) Attorney, Agent, or Firm—Antonelli, Terry, Stout & Kraus, LLP

(57) ABSTRACT

The abstract of the disclosure "the object of the present invention is to provide a technology that can prevent the reduction of transaction throughput caused by the concentration of load on specific communication resources and server resources. In order to achieve this object, the present invention provides a database load distribution processing method that distributes access to a distributed database managed by a plurality of servers. The method includes: a step for monitoring the activity status of communication resources and managing communication status; a step for monitoring server activity status and managing server status; and a step for distributing access to the distributed database based on information indicating communication status and server status" is required and must be presented on a separate sheet, apart from any other text.

13 Claims, 18 Drawing Sheets

FIG.2

Resource management table (Communication resources) /27

| Communication device name | Failure information | Active status information | Operation information |
|---|---|---|---|
| CCP1 | ○ | ○ | 24H |
| CCP2 | ○ | × | 0900-1700 |
| : | : | : | : |
| CCPn | × | ○ | 1200-1700 |

FIG.3

Resource management table (Server system) /28

| Server system name | Failure information | Active status information | Operation information |
|---|---|---|---|
| SV1 | ○ | ○ | 24H |
| SV2 | × | ○ | 0900-1700 |
| : | : | : | : |
| SVn | ○ | ○ | 24H |

FIG.4

Distributing function process module path information management table 29

| Path name | Communication Entity | Communication route | Process server | Communication usage information | Server usage information | Communication load (number of transactions requested) | Server CPU load | Server load (number of transactions processed) | Use alternate |
|---|---|---|---|---|---|---|---|---|---|
| P11 | AE1 | CCP1 | SV1 | O | O | 10 | 20 | 20 | O |
| P12 | AE1 | CCP1 | SV2 | O | O | 50 | 5 | 10 | × |
| P21 | AE2 | CCP2 | SV1 | O | O | 10 | 30 | 50 | O |
| P22 | AE2 | CCP2 | SV2 | × | O | - | 10 | 15 | × |
| .. | .. | .. | .. | .. | .. | .. | .. | .. | .. |
| Pnm | AEn | CCPx | SVz | O | O | 150 | 30 | 40 | × |

(transactions/s) (%) (transactions/s)

FIG.5

Path selection table /30

| Path name | Selection priority |
|---|---|
| P11 | 2 |
| P12 | 1 |
| P21 | x |
| P22 | 3 |
| : | : |
| Pnm | n |

FIG.6

Guidelines for setting distributing function processing path selection priorities /50

Guidelines for distributing function processing path selection priority settings Selection priority settings: Using the information from the distributing function processing path information management table 29 maneged by the resource load management process module 26, the distributing function path selection managent process module sets up path names and selection priorities in the path selection table 30 based on the following setting guidelines.

Priority settings guidelines

[1] Select the path for which the communication load, the server CPU load, the server load (number of processing transactions) in the distributing function processing path information management table 29 are all lowest.

[2] It may not be possible to determined path from the guideline in [1] (e.g.,if the path with the lowest communication load is P11, the path with the lowest server load is P12) Then, the distributing function processing path detrmination information table 4 ) set up by the path selection learning process module 15 is referred to and priority is assigned for paths having similar loads (which serves as the transaction execution condition ) starting with the shortest transaction processing times.

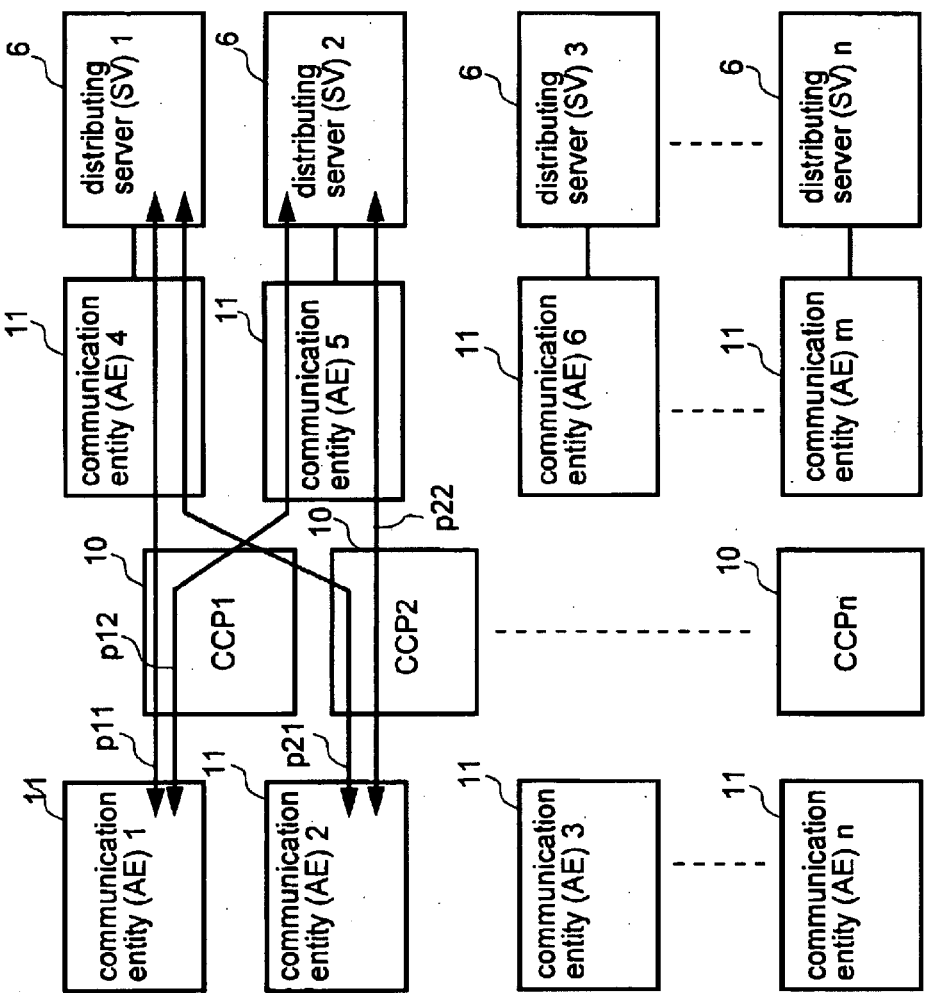

TR: average number of input transactions for time delta t
PN: current umber of distributed database processing paths
CN: current number of client-side communication entities
SVN: current number of servers that can perform processing
T1ave: average transaction processing time for past delta t
T2ave: transaction throughput for past delta t

FIG.9

Table of information for determining number of resources  40

| Time-series data/time | TR | PN | CN | SVN | T1ave | T2ave | Time |
|---|---|---|---|---|---|---|---|
| 1 | 1,200 | 10 | 10 | 8 | | | Δt1 |
| 2 | 1,500 | 11 | 10 | 7 | | | Δt2 |
| 3 | | | | | | | Δt3 |
| 4 | | | | | | | |
| 5 | | | | | | | |
| 6 | | | | | | | |
| ⋮ | | | | | | | |
| ⋮ | | | | | | | |
| N | 200 | 5 | 4 | 2 | | | ΔtN |

FIG.10

Table of information for determining distributing function processing path  41

| Path name | Communication Entity | Processing server | Communication load (number of transactions) | Server CPU load (%) | Server load (number of transactions) | Recent transaction processing time using path (s) |
|---|---|---|---|---|---|---|
| P11 | AE1 | SV1 | 10 | 10 | 10 | 20 |
| P12 | AE1 | SV2 | 50 | 12 | 60 | 37 |
| P21 | AE2 | SV1 | 20 | 10 | 20 | 27 |
| P22 | AE2 | SV2 | 100 | 15 | 60 | 56 |

Recent load information is output and stored for all paths every delta t (s)

P11 - P22: distributing function processing path

FIG. 13
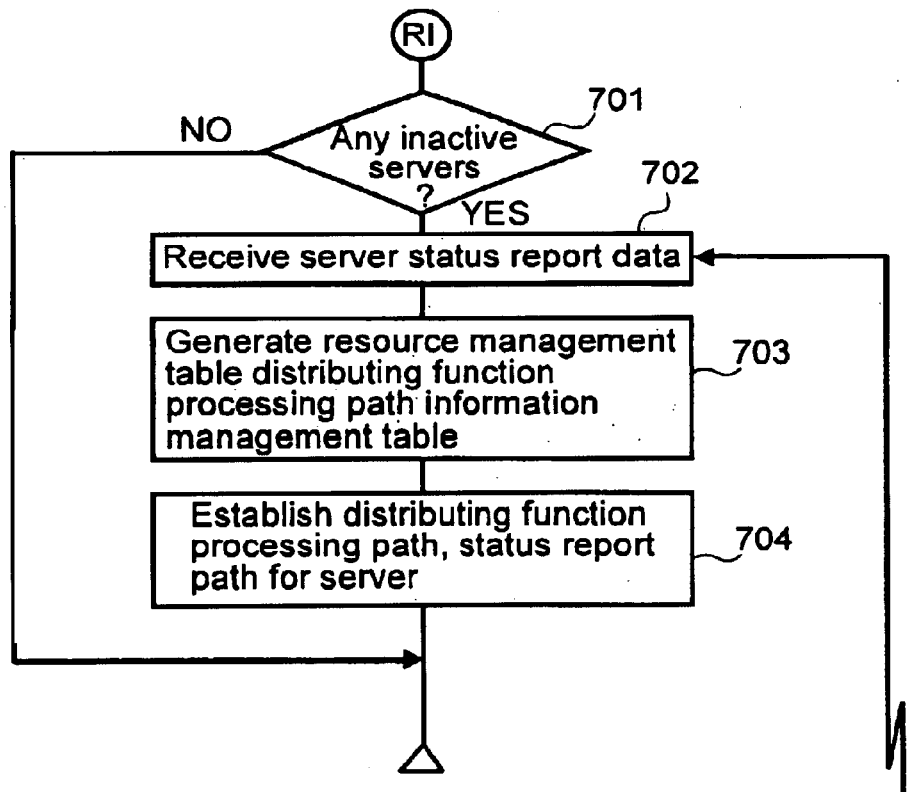
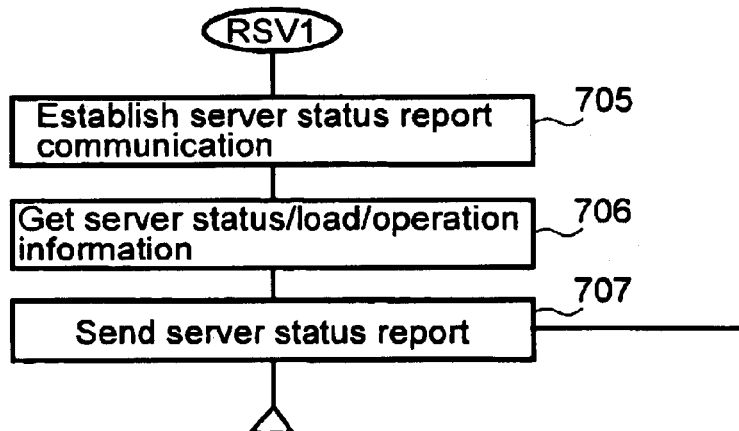

(RSV2) Server status report (server: server-side/active)

(RSV3) Server status report (server: client-side)

(M) Distributing function path selection management processing Main (M1) Path selection processing Processing for when transaction request is generated Call from distributing client when a database access request takes place

805

Present distributing function processing path having the highest selection priority (R) Resource load management processing Main (R1) Communication status management processing (R2) Server status management processing (R3) Alternate path management processing (SI) Bigin path selection learning processing (ST) Terminate path selection learning processing (S) Path selection learning processing Main (S1) Get transaction statistical information (S2) Resource usage optimization (S3) Path selection priority information management

DATABASE LOAD DISTRIBUTION PROCESSING METHOD AND RECORDING MEDIUM STORING A DATABASE LOAD DISTRIBUTION PROCESSING PROGRAM

BACKGROUND OF THE INVENTION

The present invention relates to a database load distribution processing method distributing database access loads, a device for the same, and a recording medium recording a program for the same. More specifically, in a distributed database access environment where a plurality of server systems is connected to a client system via a plurality of communication lines, the present invention relates to a technology that can be effectively applied to a database load distributing system that performs load distribution using transactions that execute distributing functions.

In conventional distributed database systems that use multiple servers, processing efficiency is improved by applying load distribution based on individual transaction processing programs and application programs. Japanese laid-open patent publication number Hei6-110850 describes a load distribution method for an on-line system that performs load distribution, where individual application programs serve as load distribution units. In this method, processing is assigned to the computer system in the network having the lowest load for the particular application program.

Also, in conventional distributed database systems, user application programs (UAPs) are written with a built-in retry function that attempts a retry operation when a transaction error event is detected. Thus, if a transaction is executed and result in an error, this indicates that there was a failure in the resources being used or that the resource is inactive, and this transaction is attempted again through the retry function described above.

Furthermore, in conventional distributed database systems, past transaction processing results are output to files to serve as transaction statistics information. This information is edited and analyzed manually to determine the number of distributing function processing paths. This distributing function processing path number is used for processing transactions, thus improving throughput for the next transaction.

In order to distribute transaction loads in a communication/server system available for transaction loads so that a distributed transaction throughput can be maintained, detection and management of active status and load status must be possible in real time for the communication and the server system. Not only must there be unified management of load usage for the multiple system resources needed for distributed database processing and load distribution of individual resources, but also system resource allocations must be performed so that the desired distributed database transaction processing efficiency can be achieved.

However, the conventional distributed database systems that use multiple servers do not perform unified management of a plurality of system information (e.g., loads on the communication environment needed for distributed database processing, loads on the CPU performing server processing, and server transaction processing loads) to allow selection of optimal execution resources on the basis of experiential values and the like. Thus, even in an execution environment where there are multiple communication resources and transaction processing servers, transaction loads are not distributed. This means that loads can be concentrated on specific processing resources, resulting in increased wait times for processing. This decreases transaction throughput and makes it difficult to provide a transaction performance for the total distributed database that takes advantage of the system environment.

Also, in conventional distributed database systems, the UAPs are written with built-in retry function for detecting transaction error events and attempting retries. This requires extra effort when developing UAPs to provide retry functions. Furthermore, when a failure takes place in a distributing function processing path, the inactivity/failure status for the resource being used must be determined and an alternate path must be set up or selected in order to minimize effects on the execution of other transactions. However, in the retry function described above, the UAP performing the retry operation first recognizes the inactivity/failure status when the executed transaction returns an error. Thus, when a failure takes place, transaction error events will take place repeatedly until all the UAPs recognize the inactivity/failure status. This will decrease transaction throughput.

In distributed database systems, the distributing function execution resources must be tuned according to dynamic changes in the execution environment resulting from changes in the nature of operations and increases in transaction volume. However, in the conventional distributed database system described above, a target transaction throughput is implemented through a distributing function processing path resource number determined by editing and analyzing information based on the results of past transaction processing, which had been output as a file to serve as transaction statistics information. As a result, communication and server resource numbers cannot be automatically assigned according to increases in transaction volumes that accompany dynamic fluctuations in operations traffic.

SUMMARY OF THE INVENTION

The object of the present invention is to overcome the problems described above and to provide a technology that makes it possible to prevent reductions in transaction throughput caused by load concentration on specific communication resources and server resources.

Another object of the present invention is to provide a technology that makes it possible to prevent reductions in transaction throughput caused by multiple transaction execution errors that take place when retry operations are performed in response to when a failure, as well as to eliminate the need to have transaction retry functions built in to UAPs.

Yet another object of the present invention is to provide a technology that makes it possible to reduce the number of steps required for resource tuning by eliminating the process of acquiring, editing, and analyzing transaction statistics for the purpose of determining a processing path number during execution of distributed transactions.

In a database load distribution processing system that distributes the load for accesses to a distributed database managed with a plurality of servers, the present invention performs load distribution for database accesses based on information indicating communication status and server status.

In a communication status management process module of the database load distribution processing system according to the present invention, communication resource failures, load, and activity status are monitored and communication status is managed. In a server status management process module, server failure, load, and activity status are monitored and server status is managed.

A distributing function path selection accesses information indicating communication status and server status and sets up a selection priority for each of the distributing function processing paths on the basis of priority settings guidelines. When a transaction processing request takes place, a distributing function processing path is indicated to a distributing client based on the selection priority settings, and the distributing clients uses the indicated distributing function processing path to request transaction processing.

If there is a failure in a communication resource or a server, an alternated path management process module determines the distributing function processing path in which the failure took place and sets up the path having the highest selection priority as an alternate path. If a transaction was being processed using the path on which the failure took place, the transaction that generated the error due to the failure is retried using the alternate path.

A path selection learning process module compares current transaction volume to load distribution statistical information data, which indicates past transaction processing results, and determines a distributing function processing path number. Resource usage is then optimized by changing the current processing path number to the distributing function processing path number determined above. For each of the optimized distributing function processing paths, transaction processing times, which indicate the processing times required for transaction processing, are recorded.

A distributing function path selection management process module uses information indicating communication status, server status, and transaction processing times to set up selection priorities for each of the optimized distributing function processing paths. These selection priority settings are used to indicate a distributing function processing path to the distributing client.

With a database load distributing processing system according to the present invention as described above, the load from distributed transaction requests can be distributed over a plurality of communication resources and server resources based on communication status and server status. This makes it possible to prevent transaction throughput reductions caused by concentration of load on specific communication resources and server resources.

BRIEF DESCRIPTION OF THE DRAWING

FIG. 1 is a schematic drawing showing the structure of a database load distribution processing system according to this embodiment.

[FIG. 2]

FIG. 2 is a drawing showing an example of communication resource management data according to this embodiment.

[FIG. 3]

FIG. 3 is a drawing showing an example of server resource management data according to this embodiment.

[FIG. 4]

FIG. 4 is a drawing showing an example of distributing function processing path information management data according to this embodiment.

[FIG. 5]

FIG. 5 is a drawing showing an example of path selection information data according to this embodiment.

[FIG. 6]

FIG. 6 is a drawing showing an example of distributing function processing path selection priority settings guidelines according to this embodiment.

[FIG. 7]

FIG. 7 is a schematic drawing showing distributing function processing paths according to this embodiment.

FIG. 8 is a schematic drawing showing the interface involved in the path selection learning process module 15 according to this embodiment.

[FIG. 9]

FIG. 9 is a drawing showing an example of resource number determination information according to this embodiment.

[FIG. 10]

FIG. 10 is a drawing showing an example of distributing function processing path determination information according to this embodiment.

FIG. 11 is a flowchart showing the sequence of operations performed in this embodiment to initialize distributing function path management.

FIG.

FIG. 12 is a flowchart showing the sequence of operations performed in this embodiment to terminate distributing function path management.

[FIG. 13]

FIG. 13 is a flowchart showing the sequence of operations performed in this embodiment by a server status management process module 13 and a server status report process module 24.

FIG. 14 is a flowchart showing the sequence of operations performed in this embodiment for server-initiated server status management reports.

FIG. 15 is a flowchart showing the sequence of operations performed in this embodiment for client-initiated server status management reports.

FIG. 16 is a flowchart showing the sequence of operations performed in this embodiment by a distributing function path selection management process module 9.

FIG. 17 is a flowchart showing the sequence of operations performed in this embodiment to select paths.

FIG. 18 is a flowchart showing the sequence of operations performed in this embodiment to indicate paths.

FIG. 19 is a flowchart showing the sequence of operations performed in this embodiment by a resource load management process module 26.

FIG. 20 is a flowchart showing the sequence of operations performed in this embodiment to manage communication status.

FIG. 21 is a flowchart showing the sequence of operations performed in this embodiment to manage server status.

FIG. 22 is a flowchart showing the sequence of operations performed in this embodiment to manage alternate paths.

FIG. 23 is a flowchart showing the sequence of operations performed in this embodiment to initialize path selection learning.

FIG. 24 is a flowchart showing the sequence of operations performed in this embodiment to terminate path selection learning.

FIG. 25 is a flowchart showing the sequence of operations performed in this embodiment for path selection learning.

FIG. 26 is a flowchart showing the sequence of operations performed in this embodiment for acquiring transaction statistics.

FIG. 27 is a flowchart showing the sequence of operations performed in this embodiment to optimize the number of resources used.

FIG. 28 is a flowchart showing the sequence of operations performed in this embodiment to manage path selection priority information.

DETAILED DESCRIPTION OF THE PREFERRED EMBODIMENTS

The following is a description of a database load distribution processing system according to an embodiment that distributes database access load based on communication status and server status.

Figure 1:
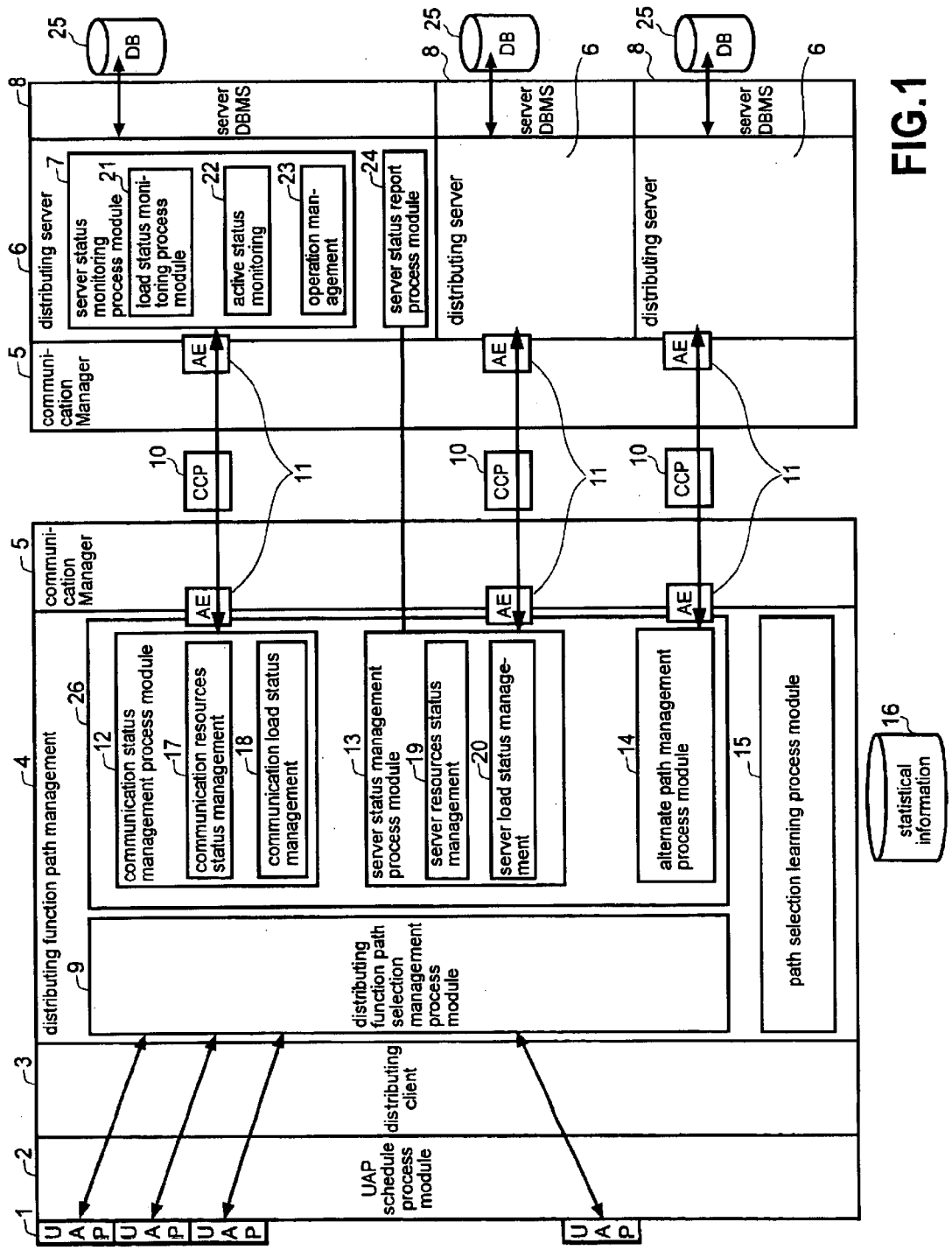
[FIG. 1]

FIG. 1 is a schematic drawing showing the structure of the database load distribution processing system according to this embodiment. As shown in FIG. 1, the database client in this embodiment includes: a distributing function path selection management process module 9; a resource load management process module 26; a communication status management process module 12; server status management process module 13; an alternate path management process module 14; a path selection learning process module 15; a communication resource status management process module 17; a communication load status management process module 18; a server resource status management process module 19; and a server load status management module 20.

The distributing function path selection management process module 9 sets up selection priorities for distributing function processing paths based either on information indicating communication and server status or on past transaction processing times. The distributing function path selection management process module 9 then notifies distributing clients of distributing function processing paths based on the selection priorities that were set up.

The resource load management process module 26 is a process module that manages failure status, loads, and activity status for the communication and server resources. The communication status management process module 12 is a process module that manages communication status by monitoring failure status, loads, and activity status for communication resources.

The server status management process module 13 is a process module that manages server status by monitoring failure status, loads, and activity status for the servers. If a failure takes place in a communication resource or a server, the alternate path management process module 14 determines the distributing function processing path where the failure is taking place, sets up the path having the highest selection priority described above as an alternate path, and uses this alternate path to perform a retry of the transaction for which an error occurred due to the failure.

The path selection learning process module 15 is a process module that changes the processing path number used for processing into a distributing function processing path number appropriate for the transaction volume, and then records a transaction processing time, indicating the processing time required for processing the transaction, for each of the function processing path.

The communication resource status management process module 17 is a process module that manages communication resource status, e.g., the distributing function processing path number and the communication entity number. The communication load status management process module 18 is a process module that manages communication load, e.g., transaction request volumes.

The server resource status management process module 19 is a process module that manages server resource status, e.g., the number of processing servers. The server load status management module 20 is a process module that manages server load status, e.g., transaction volumes processed by servers.

The functions for the distributing function path selection management process module 9, the resource load management process module 26, the communication status management process module 12, the server status management process module 13, the alternate path management process module 14, the path selection learning process module 15, the communication resource status management process module 17, the communication load status management process module 18, the server resource status management process module 19, and the server load status management module 20 can be implemented in database clients through a program that is recorded on a storage medium such as a CD-ROM, stored on a magnetic disk or the like, and then loaded into memory and executed. The medium on which the program is recorded can also be a medium other than a CD-ROM.

The database servers include: a server status monitoring process module 7; a load status monitoring process module 21; an active statues monitoring process module 22; an operation management process module 23; and a server status report process module 24.

The server status monitoring process module 7 is a process module that monitors server failures, loads, and activity status. The load status monitoring process module 21 is a process module that monitors the transaction volumes processed by the servers. The active status monitoring process module 22 is a process module that monitors the active status of the servers.

The operation management process module 23 is a process module that manages server operations. The server status report process module 24 is a process module that takes information indicating server status obtained from the server status monitoring process module 7 and reports it to the server status management process module 13.

The functions for the server status monitoring process module 7, the active status monitoring process module 21, the active status monitoring process module 22, the operation management process module 23, and the server status report process module 24 can be implemented in database servers through a program that is recorded on a storage medium such as a CD-ROM, stored on a magnetic disk or the like, and then loaded into memory and executed. The medium on which the program is recorded can also be a medium other than a CD-ROM.

The following is a description of how communication resources, server resources, and information about distributing function processing paths are managed, with references to FIG. 2 through FIG. 5.

FIG. 2 shows an example of communication resource management data according to this embodiment. For each communication processing device 10, a resource management table 27 contains settings indicating failure information, activity information, and operations information. Failure information is information indicating the presence or absence of failure. Activity information is information indicating whether the system is running or not. Operations information is information defining the operating hours for the communication processing device 10.

The information about communication resources described above is retrieved each time a communication resource is opened when the distributing function path management process unit 4 is started up, a communication failure takes place or there is recovery from a communication failure, the communication load increases, or at a monitoring interval (delta t) defined by the system. The resource load management process module 26 and the distributing client 3 checks to see when the information should be retrieved.

FIG. 3 shows an example of server resource management data according to this embodiment. A resource management table 28 is a table that manages the failure information, the activity information, and the operations information for each of the distributing servers 6 that executes distributed transaction processing. Failure information is information indicating the presence or absence of failure. Activity information is information indicating whether the server is running or not. Operations information is information defining the operating times for the system.

The information about server resources described above is retrieved each time a server status confirmation processing is performed when the distributing function path management process unit 4 is started up, a server status report is received when a server is started up, a server status report is received when a server failure takes place or there is a recovery from a server failure, a server status report is received when there is an increase in the server processing transaction load, or a server status report is received at a monitoring interval (delta t) defined by the system.

The server status reports described above are sent via a server status reporting communication route and communication protocol established when the system is started and operating between the server status management process module 13 on the client side and the server status report module 24 on the server side. The server detects triggers for retrieving the information described above and a server-initiated transmission to the client takes place. It would also be possible to use the timer in the distributing client 3 that monitors server system inactivity.

FIG. 4 shows an example of distributing function processing path data according to this embodiment.

Based on the resource management table 27 and the resource management table 28 created from the triggers described above, the distributing function processing path table 29 is created during these same triggers. For each distributing function processing path (an abstract resource unit that executes distributed transactions), this table manages information indicating a communication path, a communication route, a pressing server, communication usage information, server usage information, communication load, server CPU load, server transaction load, and whether or not an alternate path can be used.

The communication path indicates an appropriate communication entity 11. The communication route indicates an appropriate communication device name. The processing server indicates the appropriate distributing server 6. The communication usage information indicates whether the communication processing device 10 and the communication function is active or not. The server usage information indicates whether the server system is active or not. If either the communication usage information or the server usage information is false, the corresponding distributing function processing path cannot be used.

The communication load indicates the transaction volume that makes send request using the communication entity. The server CPU load indicates the rate of CPU usage at the server system for the communication path. The server transaction load indicates the server transaction volume at the server system that is executing distributed database access server processing.

If alternate paths are to be used, an indication is provided for whether this distributing function processing path is being used for alternates.

FIG. 5 shows an example of path selection information data according to this embodiment. The resource load management process module 26 manages the resource management table 27, the resource management table 28, and the distributing function processing path information management table 29. A path selection table 30 is used to manage selection priorities for the distributing function processing paths handled by the distributing function processing path information management table 29. The distributing function path selection management process module 9 uses the distributing function processing path selection priority settings guidelines in order to assign selection priorities to each of the distributing function processing paths.

FIG. 6 shows an example of distributing function processing path selection priority settings guidelines. The following is a description of a method for setting up distributing function processing path selection priorities based on: the distributing function processing path information management table 29, a distributing function processing path selection priority settings guideline 50, the path selection table 30, and a distributing function processing path determination information table 41.

At predetermined intervals, the distributing function path selection management process module 9 refers to the distributing function processing path information management table 29 set up by the resource load management process module 26. Then, selection priorities are assigned to each of the distributing function processing paths and the path selection table 30 is generated.

The guidelines for assigning selection priorities are as follows. First, in [1], selection priority is assigned to the distributing function processing path for which the communication load, the server CPU load, and the server load processing transaction volume) are all lowest. It may not be possible to determine a path from the guideline in [1] (in case where selection priority cannot be set based solely on guideline [1], such as when the path with the lowest communication load is P11, the path with the lowest server load is P12, and the like). Then, using [2], the distributing function processing path determination information table 41 shown in FIG. 10 is referred to, and in cases where paths have similar loads, priority is assigned to the paths with the shortest transaction processing times.

The distributing function processing path determination information table 41 contains past statistical information and is managed in memory by the path selection learning process module 15. When the system is terminated, the table is saved as a statistical information storage file 16. When the system is started up, a fixed amount of past data is real in to memory from the statistical information storage file 16.

The distributing function path selection management process module 9 sets up path selection priorities in the path selection table 30 at a predetermined interval that is not synchronized with distributed transaction requests. Thus, when a request is issued for a distributed transaction, the distributing client 3 can simply select the path with the highest selection priority in the path selection table 30, thus reducing the overhead involved in selection operation.

FIG. 7 is a schematic drawing showing distributing function processing paths according to this embodiment. Distributing function processing paths are the abstract resource units that execute distributed transactions. The distributing function processing paths P11, P12, P21, P22 are each defined by the distributing function path management process unit 4 as a combination of communication entities 11 (AE), which serves as a sending/receiving resource unit, a communication processing device 10, and a distributing server 6.

Figure 8:
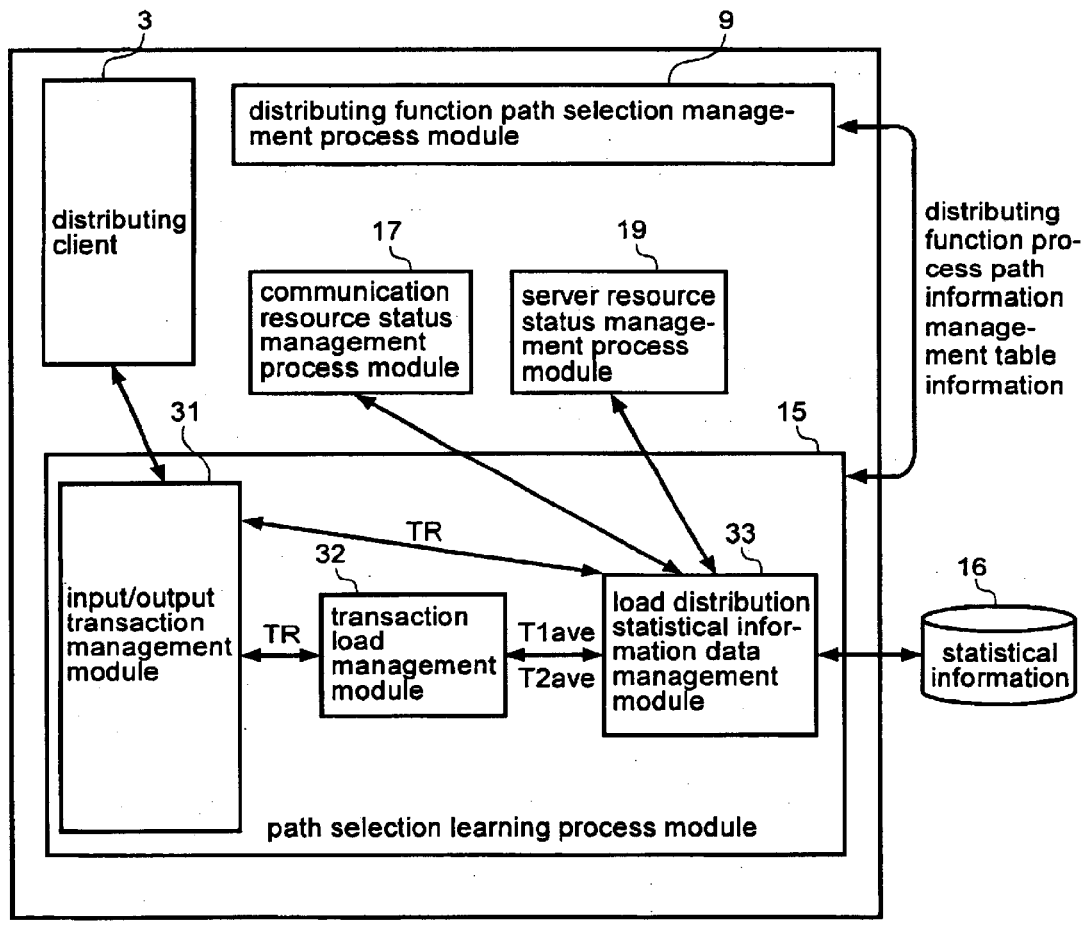
[FIG. 8]

FIG. 8 is a schematic drawing indicating the interface involved in the path selection learning process module 15 according to this embodiment. The path selection process module 15 includes: an input/output transaction management module 31; a transaction load management module 32; and a load distribution statistical information data management module 33. The path selection process module 15 uses the statistical information storage file 16 to perform processing.

The path selection learning process module 15 manages a load distribution optimization statistical information table (a resource number determination information table 40) in memory that includes: the past average executed transaction volume (TR) for the time delta t; the current number of distributing function processing paths (PN); the number of client side communication entities (CN); the number of processing servers (SVN); the calculated average transaction processing time for delta t_ (T1ave); and the calculated transaction throughput for delt t (T2ave).

The distributing client 3 has access to the current number of input transactions. At checkpoints defined as the interval delta t, the input/output transaction management module 31 manages the total number of transactions and the input/output times and processing times for each transaction, and calculates the average executed transaction volume (TR) for delta t.

The transaction load management module 32 calculates T1ave and T2ave from the TR for delta t. The load distribution statistical information data management module 33, which manages the resource number determination information table 40, obtains TR from the input/output transaction management module 31, T1ave and T2ave from the transaction load management module 32, PN and CN from the communication resource status management process module 17, and SVN from the server resource status management process module 19.

In addition to the input/output times for individual transactions and the processing times for individual transactions, the input/output transaction management module 31 keeps track of the distributing function processing path used by individual transactions in memory. This information managed by the input/output transaction management module 31 and the information from the distributing function processing path information management table 29 are used by the load distribution statistical information data management module 33 at a predetermined interval to add an entry into the distributing function processing path determining information table 41 in memory for each distributing function processing path. The entry contains the communication load, the server CPU load, the server load (transaction volume), and the transaction processing time for recent executions of transactions that used the path.

When the system terminates, the load distribution statistical information data management module 33 transfers the load distribution optimization statistical information tables (the resource number determination information table 40 and the distributing function processing path determination information table 41) from memory into a file. When the system is started up, a system-defined range of data is loaded into and kept in memory from the file containing the load distribution optimization statistical information table.

FIG. 9 shows an example of the resource number determination information according to this embodiment. The resource number determination information table 40 stores statistical information data that is referenced and generated for the purpose of calculating a distributing function processing path number from the transaction volume for a past interval delta t and to vary the current distributing function processing path number automatically. The values for TR, PN, CN, SVN, T1ave, and T2ave for intervals of a system-defined delta t form one record, and these records are arranged in time sequence.

FIG. 10 shows an example of distributing function processing path determination information according to this embodiment. The distributing function processing path determination information table 41 stores statistical information data that is referred to when the distributing function paths election management process module 9 sets up selection priorities for distributing function processing paths in the path selection table 30. This allows the selection priority to be increased for distributing function processing paths that have minimal transaction processing times. Both of these tables are managed by the path selection learning process module 15.

The following is a description of the flow of operations performed in this embodiment, with references to the figures. First, the starting and terminating operations for the distributing function path management process unit 4 will be described, with references to FIG. 11 and FIG. 12.

Figure 11:
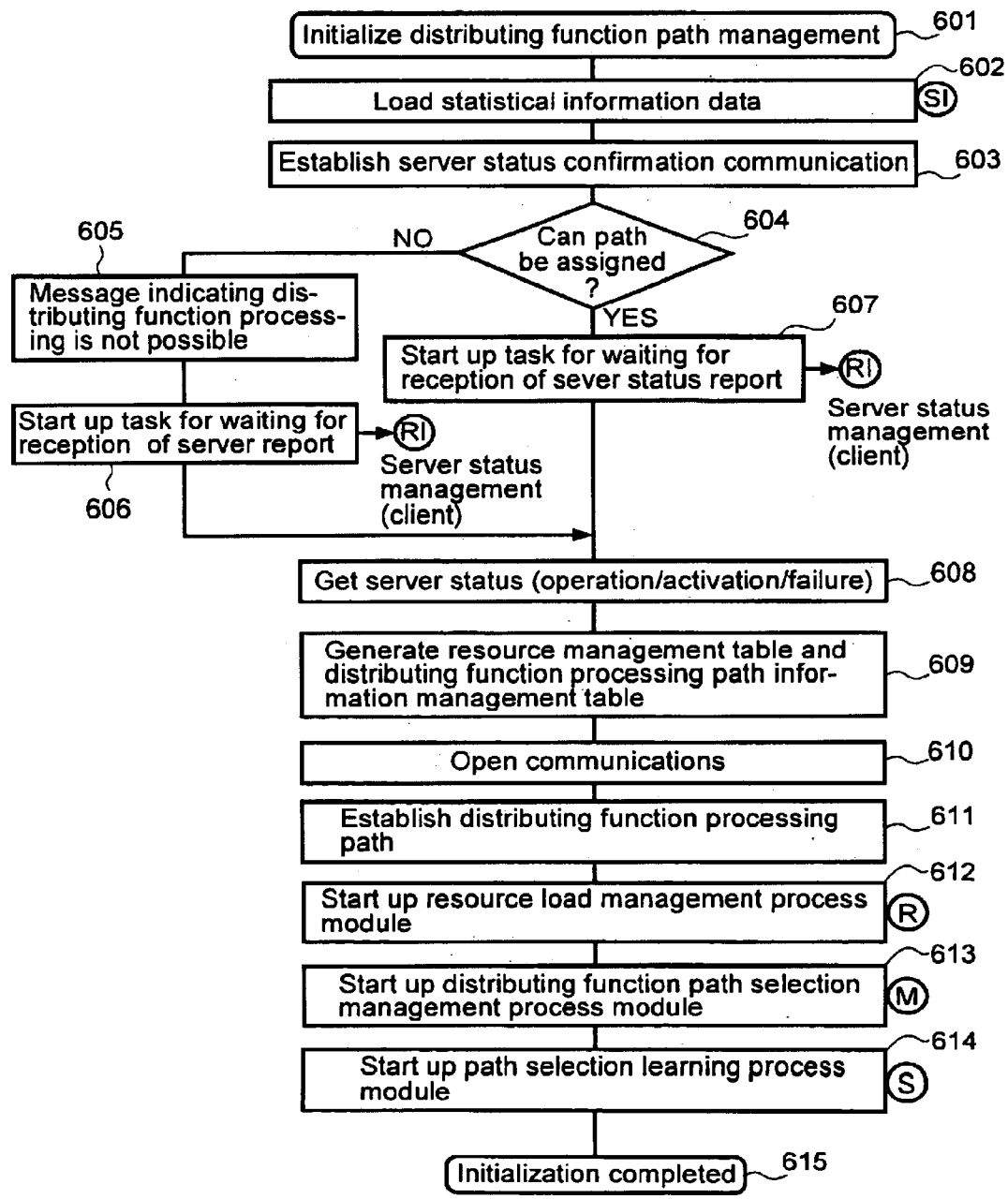
[FIG. 11]

FIG. 11 is a flowchart showing the sequence of operations performed in this embodiment for starting distributing function path management. When the system is started up, the resources for the distributing function path management are initialized at step 601. At step 602, the path selection learning process module 15 loads the load distribution optimization statistical information tables (the resource number determination information table 40 and the distributing function processing path determination information table 41). At step 603, a server status report communication resource is opened between the server status management process module 13 and the server status report process module 24.

At step 604, a determination is made to see if at least one distributing function processing paths can be allocated. If there is at least one distributing server system that is running, control proceeds to step 607, and a task for waiting for receipt of a server-status report is run in order to receive status report data sent via the server status report communication resource when an inactive server starts up or in order to receive status report data sent periodically by a running server. If no running server was found at step 604, a message is output to indicate that distributed processing is not possible. Then, at step 606, the task described above for waiting for receipt of a server-status report is run.

Then, at step 608, operations, activity, and failure information for running servers is obtained from the status report data. At step 609, the resource management table 28 and the distributing function processing path information management table 29 are created.

Next, at step 610, a communication resource is opened. When this is done, the resource management table 27 is generated and if there is communication failure information it is reflected in the resource management table 27.

Then, at step 611, a distributing function processing path and a communication route are opened for execution of the distributed transaction. At step 612–step 614, the resource load management process module 26, the distributing function path selection management process module 9 and the path selection learning processing module 15 are started. Initialization operations are completed at step 615.

Figure 12:
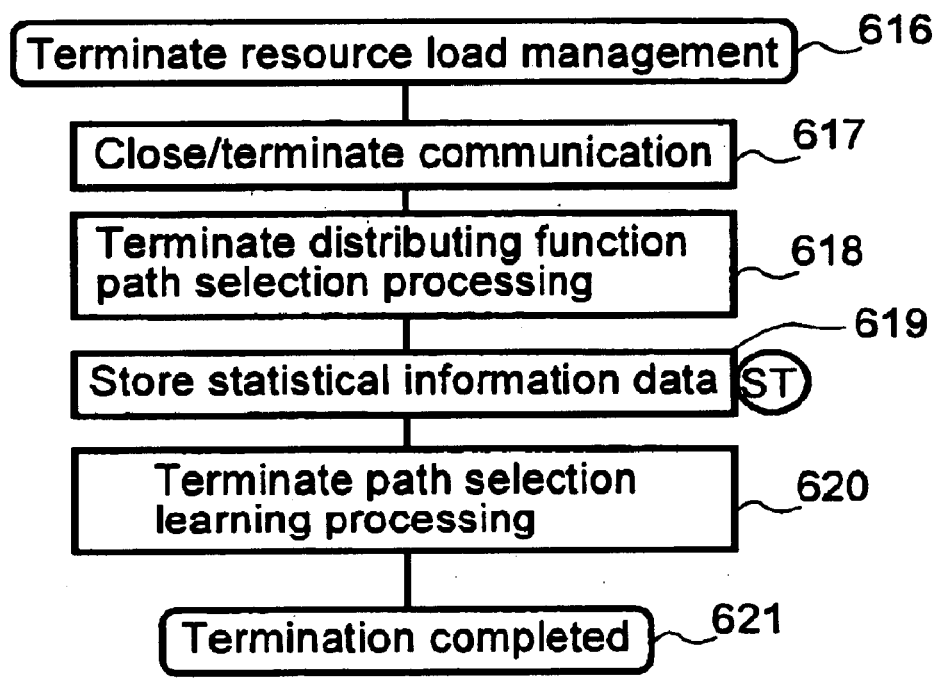
[FIG. 12]

FIG. 12 is a flowchart showing the sequence of operations performed in this embodiment to terminate distributing function path management. In order to terminate the system, the resource load management process module 26 is terminated at step 616, communication is terminated at step 617, and the distributing function path selection management process module 9 is terminated at step 618. Then, at step 619, the load distribution optimization statistical information tables (the resource number determination information table 40 and the distributing function processing path determination information table 41) are saved in a file. At step 620, the path selection learning process module 15 is terminated. Termination operations are completed at step 621.

Figure 14:
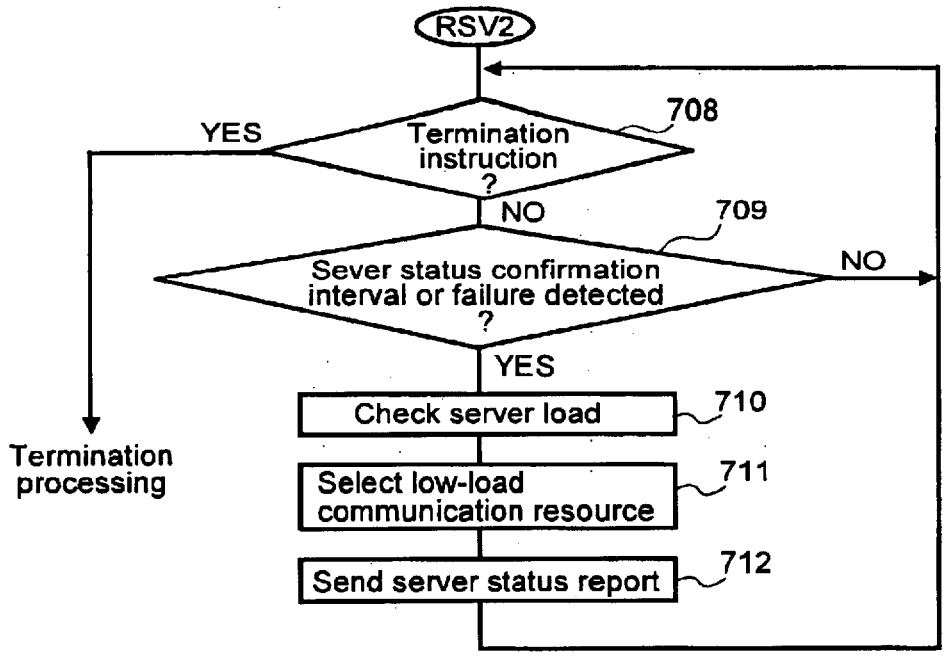
[FIG. 14]
Figure 15:
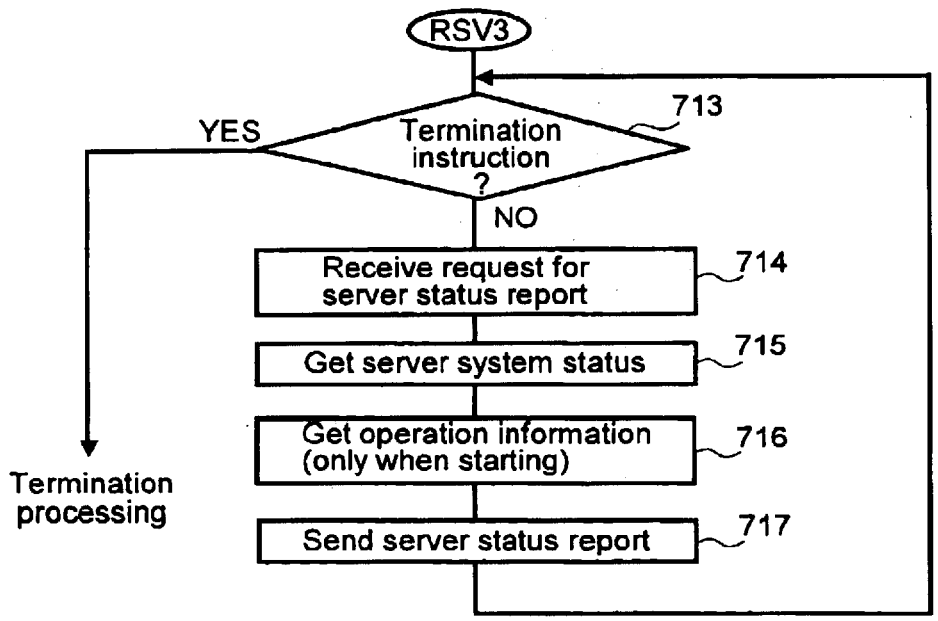
[FIG. 15]

The following is a description, with references to FIG. 13 through FIG. 15, of the operations performed by the server status management process module 13 and the server status report process module 24 when the distributing function path management process unit 4 in the client is started up.

FIG. 13 is a flowchart showing the sequence of operations performed by the server status management process module 13 and the server status report process module 24. The server status management initialization function (RI) is run during the initialization operation of the distributing function path management process unit 4. If there is an inactive server at step 701, control proceeds to step 702, where a receive operation is performed as a dedicated task to receive reports of running status from all servers defined in the system environment.

At step 703, the contents of the status report data received from the servers is used to generate or update the resource management table 27, the resource management table 28, and the distributing function processing path information management table 29.

At step 704, distributing function processing paths and server status report paths are established for servers that were found to be running. If no data is received from a server within a predetermined interval, the server is assumed to be inactive, and this is reflected in the resource management table 27, the resource management table 28, and the distributing function pressing path information management table 29. The server status management initialization function (RI) is completed when all the defined servers are running.

The operation RSV1 initializes a server status report process module 24 when a distributing server 6 is started up.

First, at step 705, the server establishes a communication route for server status reports between itself and the server status management process module 13 on the client side. At stop 706, distributing server state, server CPU load, and operations information (server system definition information and the like) are obtained. At step 707, a report is made to the server status management process module 13 indicating that the server is running.

FIG. 14 is a flowchart showing the sequence of operations performed in this embodiment for server-initiated server status management reports. There are two types of server status reports: server-initiated (RSV2) and responses to client requests (RSV3). For server-initiated reports (RSV2), a determination is made as to whether a termination instruction was issued while the distributing server 6 is running, and the operations starting with step 709 are performed until a termination instruction takes place.

At a server status confirmation interval, which is set up in a server system definition or the like, or when there is a server failure, control proceeds from step 709 to step 710 through step 712, and the server status is reported to the client. For this report, distributing server status server CPU load, server distributed database access transaction load, server DBMS load, and database exclusion information are checked and server status report transmission data is created. The resource management table 27 stored in the resource load management process module 26 in the distributing server 6 is referred to in order to send the server status report using the communication resource with the lightest load.

FIG. 15 is a flowchart showing the sequence of operations performed in this embodiment for client initiated server status management reports. For client-initiated reports (RSV3), step 713 checks for a termination instruction of while the distributing server 6 is running, and performs the operations starting with step 714 until a termination instruction takes place.

Tf, at step 714, the server status management process module 13 in the client receives a server status report query, the server status described above (the distributing server status, the server CPU load, the server distributed database access transaction load, the server DMBS load, and database exclusion information) is reported at step 715 through step 717.

Figure 16:
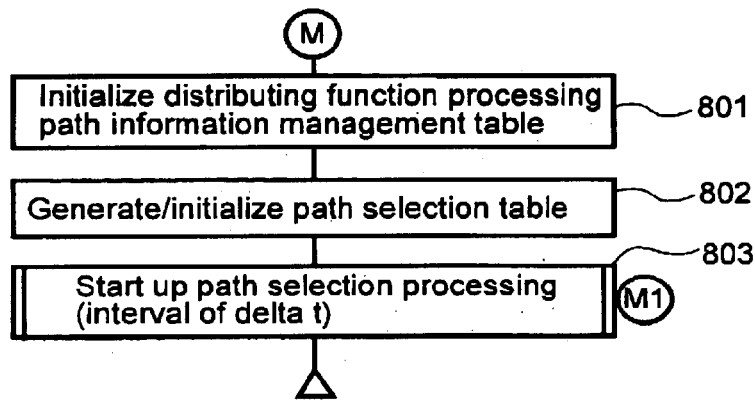
[FIG. 16]

FIG. 16 is a flowchart showing the sequence of operations performed in this embodiment by the distributing function path selection management process module 9. In the initialization operation of the distributing function path management process unit 4, the main distributing function path selection management operation (M) initializes, at step 801 and step 802, the distributing function processing path information management table 29 and the path selection table 30, which are resources of the distributing function path selection management process module 9. At step 803, the path selection function (M1) is run at delta t intervals from a dedicated task in the distributing function path selection management process module 9. The interval is not synchronized with transaction processing requests from the distributing client 3.

Figure 17:
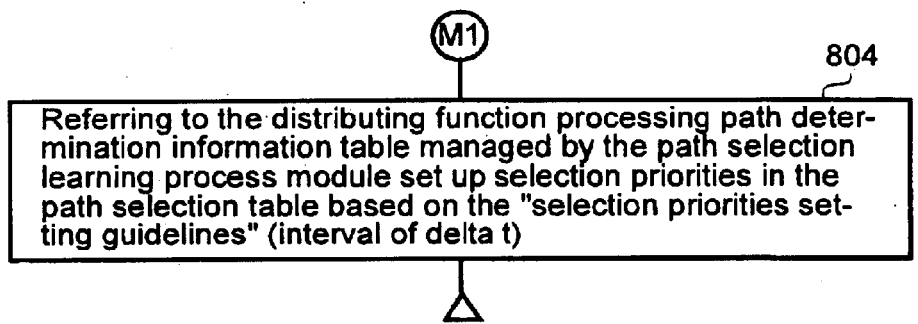
[FIG. 17]

FIG. 17 is a flowchart, showing the sequence of operations performed in this embodiment for selecting paths. In this path selection function (M1), step 804 sets up selection priorities for the distributing function processing paths in the path selection table based on the distributing function processing path selection priority settings guidelines 50 and referring to the distributing function processing path determination information table 41, which is managed by the path selection learning process module 15.

Figure 18:
[FIG. 18]

FIG. 18 is a flowchart showing the sequence of operations performed in this embodiment for indicating a path. When there is a distributed transaction request (distributed database access request) from the UAP1, the distributing function path selection management process module 9 is called from the distributing client 3, and, at step 805, the path selection table 30 set up as described above is referred to and the path having the highest selection priority is indicated to the distributing client 3. The distributing client 3 uses the indicated path to request a transaction.

In this embodiment, the UAP1 on the client system side can be logically bound within a usage resource range to a specific server system database 25 via a distributing function processing path. This provides a fixed range for a distributed database that is operated for specific operations while transaction processing loads for distributed databases performing the operations can be distributed separately.

Figure 19:
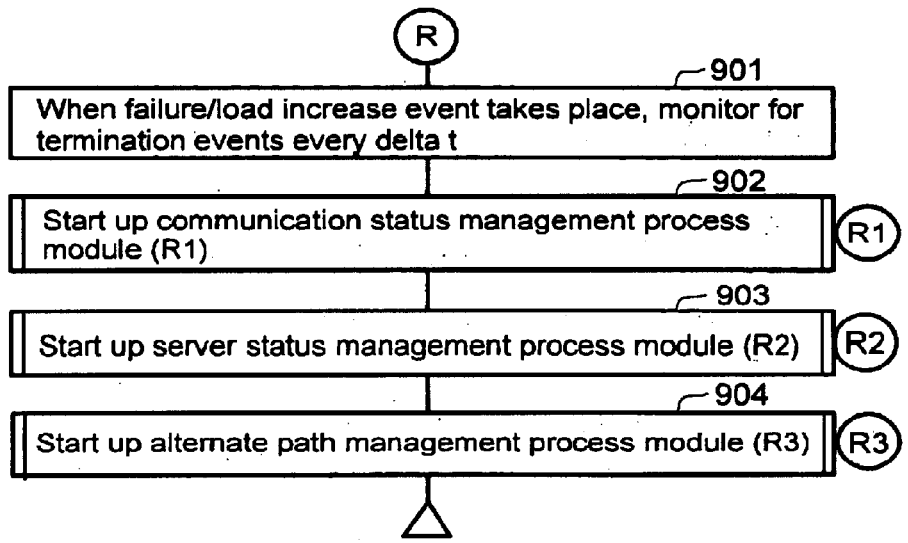
[FIG. 19]
Figure 20:
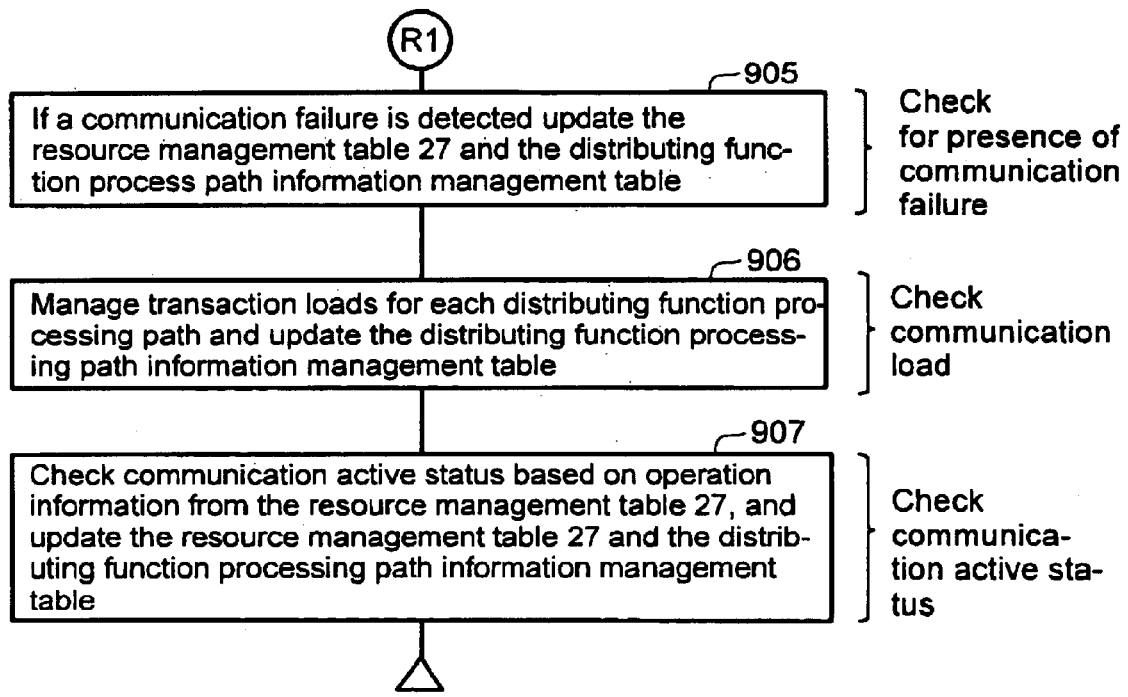
[FIG. 20]
Figure 21:
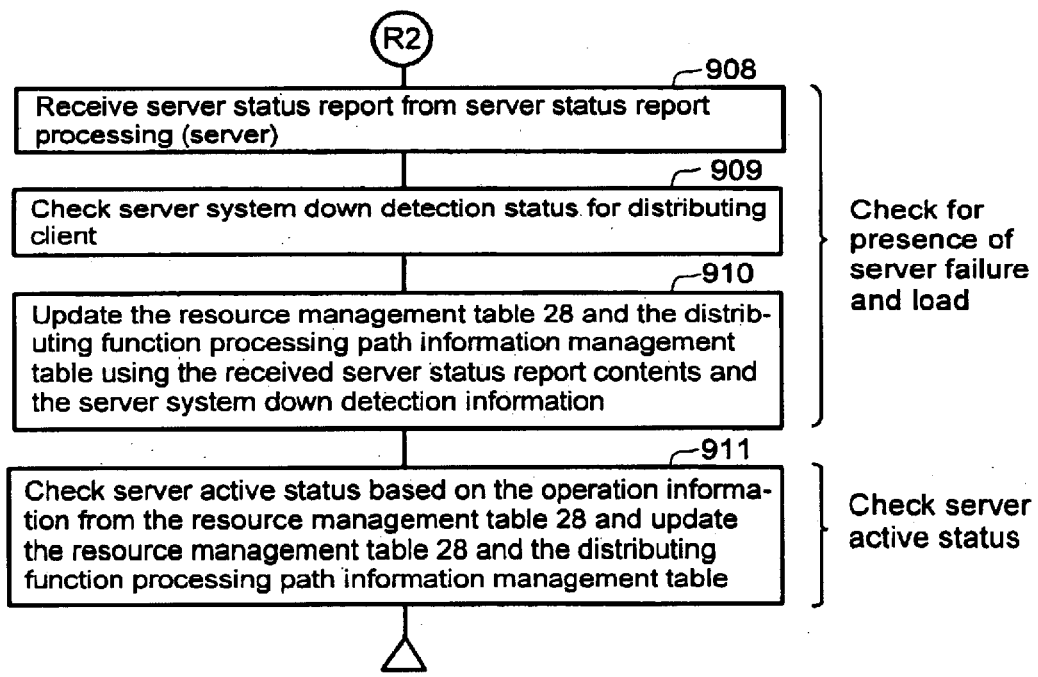
[FIG. 21]

The following is a description of the operations performed by the resource load management process module 26, which manages communication and server status (activity and load status), with references to FIG. 19 through FIG. 21.

FIG. 19 is a flowchart showing the sequence of operations performed in this embodiment by the resource load management process module 26. The resource load management main function (R) is run as a task by the initialization operations performed by the distributing function path management process unit 4. Step 901 monitors various events. If a communication failure event or a server failure event is detected from the distributing client 3 or if the distributing functions processing path management table 29 is referred to and a load increase event is detected or if a predetermined interval has elapsed, the operations in step 902 through step 904 are performed and the communication status management process module 12 (R1), the server status management process module 13 (R2), and the alternate path management process module 14 (R3) are executed.

FIG. 20 is a flowchart showing the sequence of operations performed in this embodiment to manage communication status. In the communication status management process module 12 executed as described above, the presence of communication failures, communication load, and communication activity status are managed in the following manner. If a communication failure is detected, step 905 updates the resource management table 27 and the distributing function processing path information management table 29. At step 906, the communication load in the distributing function processing path information management table 29 is updated for each distributing function processing path, and the corresponding communication load value is checked and the transaction load for each distributing function processing path is managed. At step 907, the operations information in the resource management table 27 is used to check the activity status of each communication resource, and the activity information in the resource management table 27 is updated. Than, the contents of the distributing function processing path table 29 corresponding to the modified activity information are updated.

In FIG. 21 is a flowchart showing the sequence of operations performed in this embodiment for managing server status. In the server status management process module 13 executed as described above, the presence of server failures, load status, and server activity status are managed in the following manner. First, at step 908, the server status report from the server status report process module 24 is received. At step 909, the server system inactivity detection status of the distributing client 3 is checked and this is reflected in the resource management table 28. At step 910, the contents of the received server status report are used to update failure information and load information in the resource management table 28 and the distributing function processing path information management table 29. At step 911, on the basis of the operations information in the resource management table 28, the activity status of each server is checked and the activity information in the resource management table 28 is updated. The contents of the distributing function processing path information management table 29 corresponding to the changes in the activity information are updated.

Figure 22:
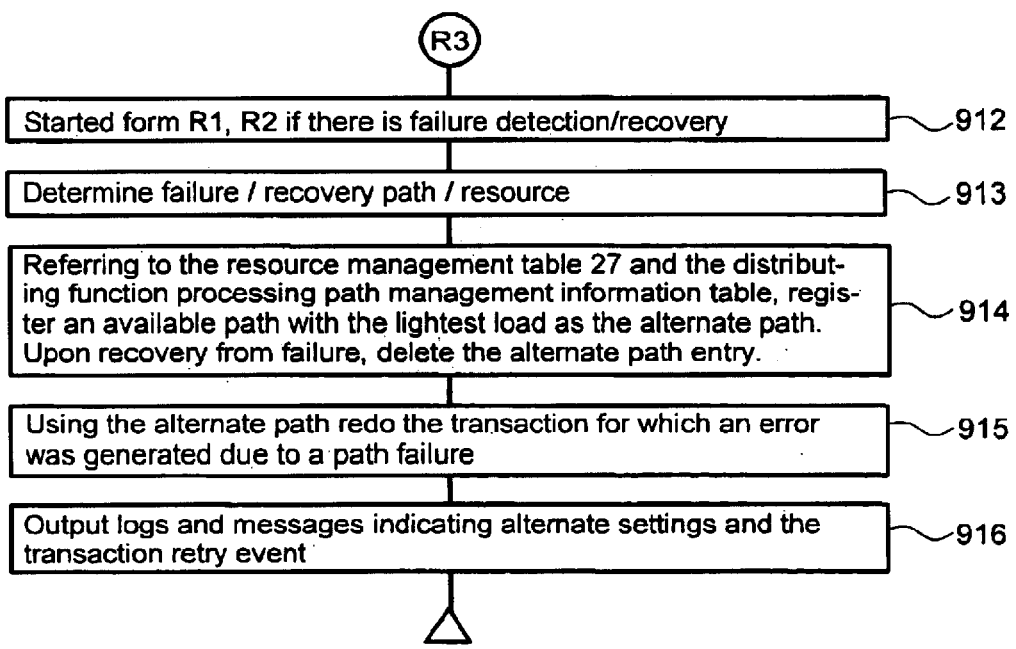
[FIG. 22]

FIG. 22 is a flowchart showing the sequence of operations performed in this embodiment to manage alternate paths. The alternate path management process module 14 is executed from the communication status management process module 12 and the server status management process module 13 if there is a communication or server failures or if there is a recovery event. At step 913, the distributing function processing path in which the communication resource failure or server resource failure or recovery event took place is determined. If there was a failure, step 914 refers to the distributing function processing path information management table 29, selects the path with the lightest load, and registers it as the alternate path. When there is recovery from failure, the alternate path registration is deleted at step 914.

At step 915, if there is a transaction that resulted in an error due to a path failure, a retry is attempted using the alternate path rather than returning an error to the UAPI.

Regarding alternate paths, a system definition can be provided beforehand to indicate that an alternate path is to be used only if there is a path failure, and this defined path can be used as the substitute path for the failed path until the failed path has recovered. Alternatively, the path having the lightest load out of the paths currently being used can be set up as an alternate path.

The former method is desirable for maintaining transaction throughput, but this requires alternate paths for each communication device and server system. Thus, if extra alternate paths cannot be set up due to system resource availability, failed transactions can be process using the alternate paths described in the latter method.

At step 916, alternate path registration/removal and error transaction retry status can be logged and output as messages so that the effect that error conditions (frequency, retry times) have on transaction throughput can be analyzed to allow tuning of system architecture resources (e.g., the number of communication lines).

Figure 23:
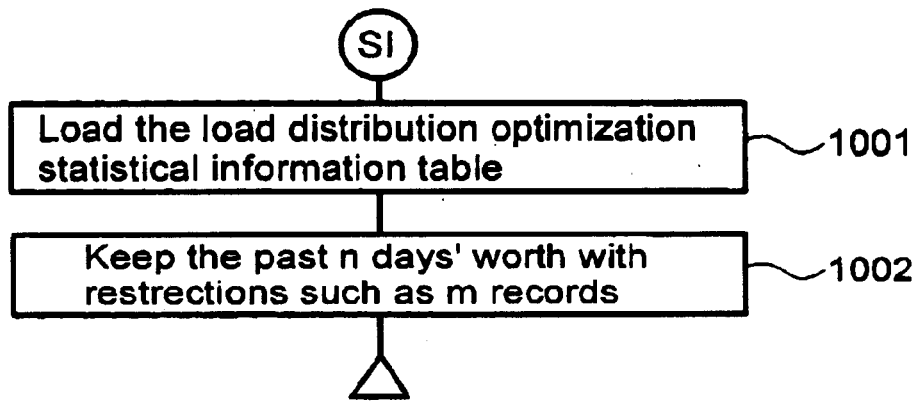
[FIG. 23]

FIG. 23 is a flowchart showing the sequence of operations performed in this embodiment to begin path selection learning. First, the path selection learning initialization function (S1) is called during the initialization performed by the distributing function path management process unit 4. At step 1001, the load distribution optimization statistical information tables (the resource number determination information table 40 and the distributing function processing path determination information table 41) are loaded from the statistical information storage file 16. The table range (e.g., n days' worth of data, m records' worth of data) to be kept in memory is set up in the system definitions, and the load distribution optimization statistical information table data for this range is set up in memory at step 1002.

Figure 24:
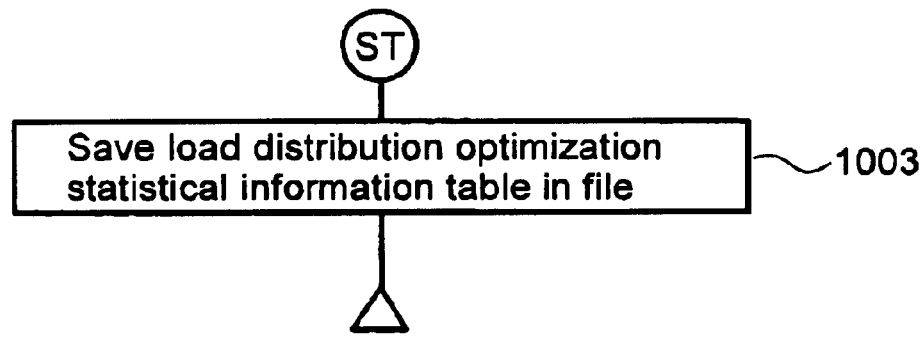
[FIG. 24]

FIG. 24 is a flowchart showing the sequence of operations performed in this embodiment to terminate path selection learning. The path selection learning termination function (ST) is called during the termination operation performed by the distributing function path management process unit 4. At step 1003, the load distribution optimization statistical information tables (the resource number determination information table 40 and the distributing function processing path determination information table 41) are transferred from memory to the statistical information storage file 16.

Figure 25:
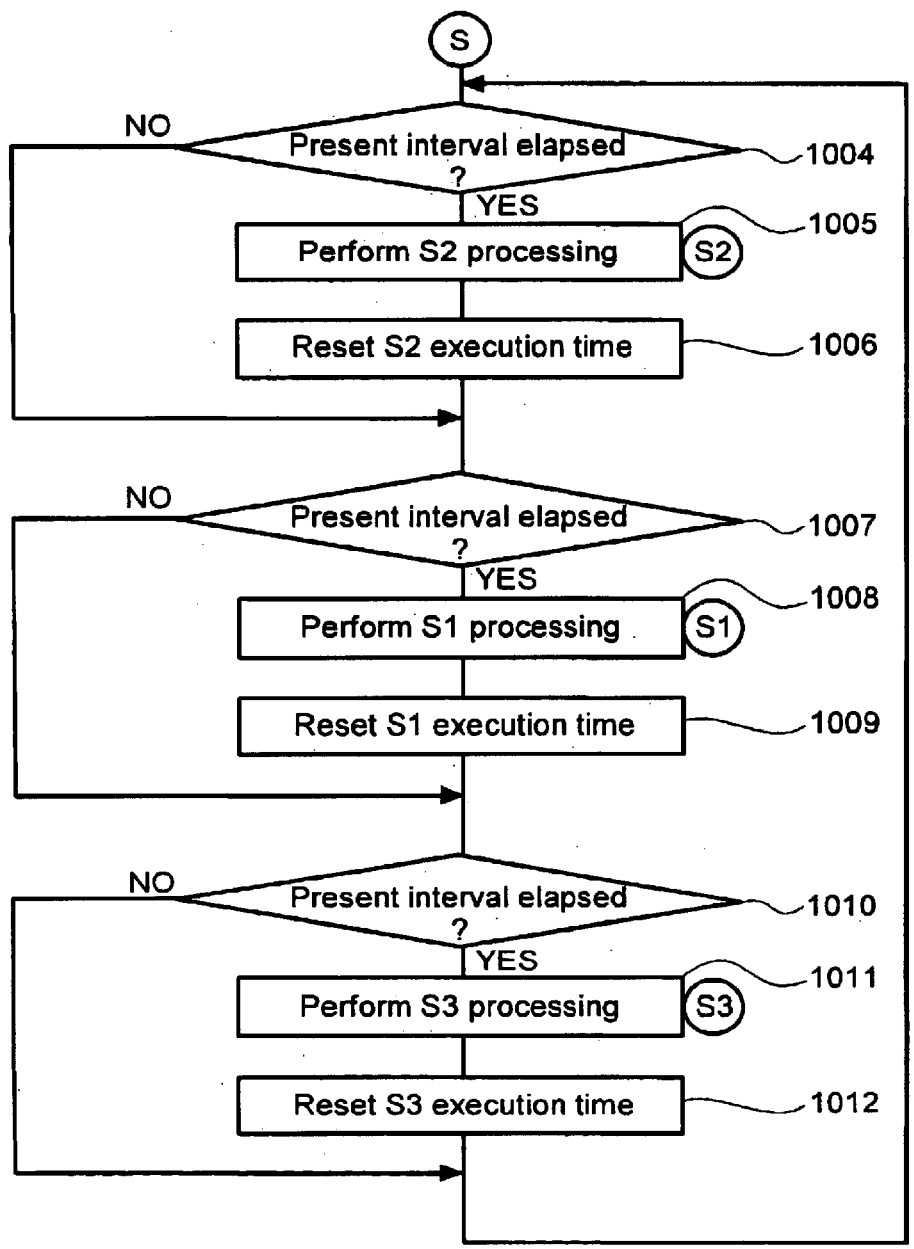
[FIG. 25]

FIG. 25 is a flowchart showing the sequence of operations performed in this embodiment to perform path selection learning. The path selection processing main function (S) is executed as a task during the initialization performed by the distributing function path management process unit 4. Each time a predetermined interval (delta t) elapses at step 1004, step 1007, and step 1010, the transaction statistical information acquisition function (S1) is executed at step 1008, the used resource number optimization function (S2) is executed at step 1005, and the path selection priority information management function (S3) is executed at step 1011.

The operations performed by the transaction statistical information acquisition function (S1), the used resource number optimization function (S2), and the path selection priority information management function (S3), executed as described above, is described below.

Figure 26:
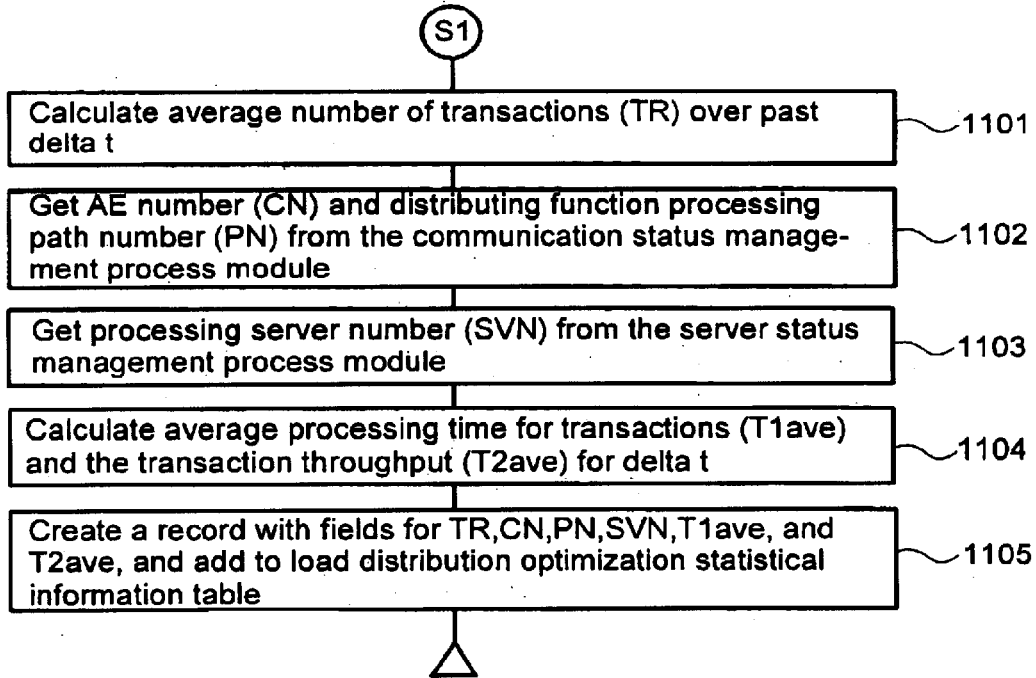
[FIG. 26]

FIG. 26 is a flowchart showing the sequence of operations performed in this embodiment to acquire transaction statistical information. In the transaction statistical information acquisition function (S1), the total transaction volumes output at a fixed interval by the distributing function path selection management process module 9 is accumulated and the average number of transactions (TR) for the past delta t is calculated at step 1101.

At step 1102, the communication number (CN) and the distributing function processing path number (PN) are acquired from the communication status management process module 12. At step 1103, the current processing server number (SVN) is acquired from the server status management process module 13.

At step 1104, the TR value described above is used to calculate the average transaction processing time (T1ave) and the transaction throughput (T2ave). At step 1105, a record having fields for TR, CN, PN, SVN, T1ave, and T2ave is created and entered in time sequence into the load distribution optimization statistical information table (the resource number determination information table 40).

Figure 27:
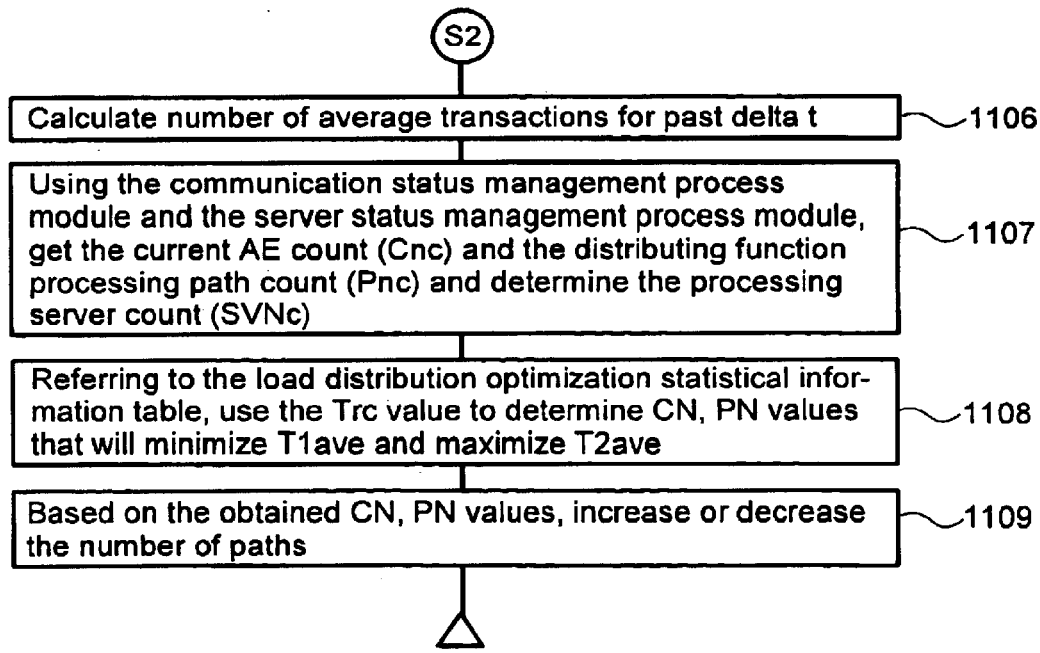
[FIG. 27]

FIG. 27 is a flowchart showing the sequence of operations performed in this embodiment for optimizing the number of used resources. In the used resource number optimizing function (S2), the past delta t average transaction number (TRc) is calculated at step 1106 in the same manner as in S1 above. Also as in S1, the current communication entity number (CNc), the distributing function processing path number (PNc), and the processing server number (SVNc) are acquired at step 1107.

At step 1008, the load optimization statistical information table (the resource number determination information table 40) is referred to and, using TRc, the CN and PN values for which T1ave will be smallest and T2ave will be largest are determined. At step 1109, the current path count is increased or reduced based on the determined values. If the path count is reduced, completion of transactions that are in the midst of being processed is awaited, and then the path is terminated.

Figure 28:
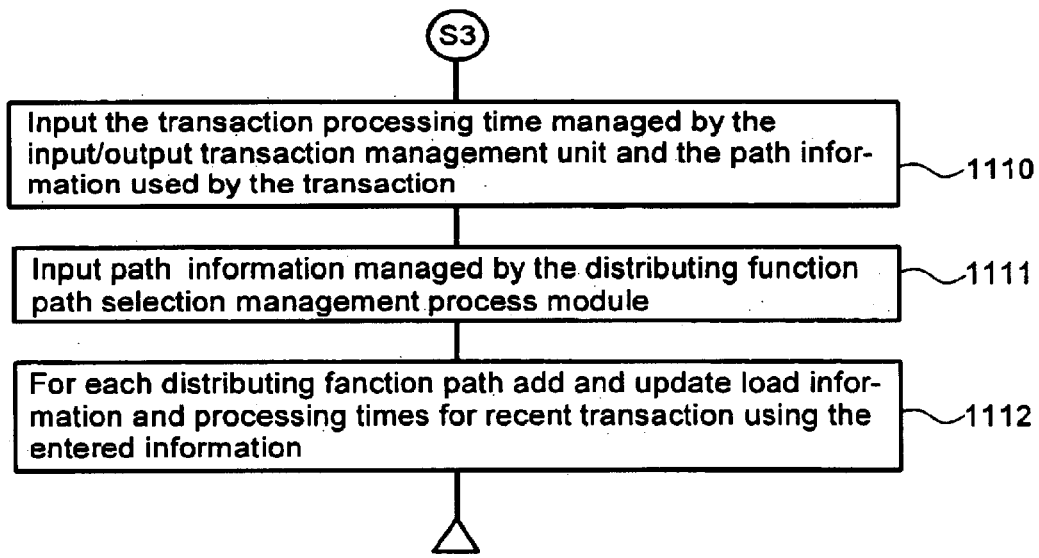
[FIG. 28]

FIG. 28 is a flowchart showing the sequence of operations performed in this embodiment to manage path selection priority information. In the path selection priority information management function (S3), transaction processing time and information about paths used by transactions, which are handled by the input/output transaction management module 31, are input. At step 1111, the path information managed by the distributing function path selection management process module 9 (the information in the distributing function processing path information management table 29) is input. At step 1112, the information input as described above is used to add/update load information and recent transaction processing time information in the distributing function processing path determination information table 41 for each distributing function processing path. Based on this information, the distributing function path selection management process module 9 generates a path selection table 30.

As described above, with a database load distribution processing system according to this embodiment, the load from distributed transaction requests can be distributed over multiple communication resources and server resources based on communication status and server status. Thus, reduction of transaction throughput resulting from the concentration of load specific communication resources or servers resources can be prevented.

Also, in the database load distribution processing system of this embodiment, transactions for which errors took place due to failures are retried using alternate paths. Thus, reductions in transaction throughput resulting from multiple transaction execution errors that accompany retry operations due to failures can be prevented, and the need to have built in transaction retry functions in UAPs can be eliminated.

Also, in the database load distribution processing system of this embodiment, statistical information relating to past transaction execution status and server resource numbers are referred to in order to provide dynamic and automatic changes in the number of resources so that they will be appropriate for the current number of transactions.

As described above, the present invention distributes the load from distributed transaction requests over multiple communication resources and server resources based on communication status and server status. This makes it possible to prevent reductions in transaction throughput resulting in concentration of load on specific communication resources and server resources.

What is claimed is:

1. In a database load distribution processing method of distributing access to a distributed database managed by a plurality of servers from a client computer, a database load distribution processing method comprising the steps of:

periodically monitoring activity status of communication resources and managing communication status by said client computer, independent of an access request;

reading the communication status and comparing a preceding communication status with a current communication status by said client computer, before receiving an access request;

periodically monitoring activity status of server and managing server status by said client computer, independent of an access request; and previously determining, by said client computers, at least one path to be used to access to said distributed database to perform a transaction processing based on said activity status of said communication resources, said activity status of said server and a result of the comparison of the preceding and current communication statuses, independent of arid before receiving an access request, wherein in said step of determining at least one path, selection of priorities for the at least one path are set up at a timing that is not synchronized with requests for access.

2. In a database load distribution processing method of distributing access to a distributed database managed by a plurality of servers from a client computer, a database load distribution processing method comprising the steps of:

periodically monitoring failures, load, and activity status for communication resources and managing communication status by said client computer, independent of an access request;

reading the communication status and comparing a preceding communication status with a current communication status by said client computer, before receiving an access request; periodically monitoring failures, load, and activity status for servers and managing server status by said client computer, independent of an access request; and determining, by said client computer, at least one path to be used to access to said distributed database to perform a transaction processing based on failures, load and activity status for said communication resources, failures, load and activity status for said servers and a result of the comparison of the preceding and current communication statuses, independent of and before receiving an access request, wherein in said step of determining at least one path, selection of priorities for the at least one path are set up at a timing that is not synchronized with requests for access.

3. A database load distribution processing method as described in claim 2, further comprising the steps of:

determining a failed path if a failure takes place, setting up a path having a highest selection priority as an alternate path, and retrying a transaction processing generating an error due to said failure using said alternate path.

4. A database load distribution processing method as described in claim 2, further comprising the steps of:

changing the number of paths being used for transaction processing to a number appropriate for a volume of transactions being processed; and recording transaction processing times indicating processing times required for processing transactions on each of said paths, wherein in said step for determining at least one path, selection of priorities for the at least one path are set up based on said activity status for communication resources, said activity status for servers status, and transaction processing times.

5. A database load distribution processing method as described in claim 4, wherein in said step of changing said path number, said path number is changed based on a comparison of past transaction processing results and current transact ion volumes.

6. In a database load distribution processing for distributing access to a distributed database managed by a plurality of servers from a client computer, a database load distribution processing device comprising:

means for periodically monitoring activity status of communication resources and managing communication status by said client computer, independent of an access request;

means for reading the communication status and comparing a preceding communication status with a current communication status by said client computer, before receiving an access request;

means for periodically monitoring activity status of server and managing server status by said client computer, independent of an access request; and means for determining, by said client computers, at least one path to be used to access to said distributed database to perform a transaction processing based on said activity status of communication resources, said activity status of server and a result of the comparison of the preceding and current communication statuses, independent of and before receiving an access request, wherein in said step of determining at least one path, selection of priorities for the at least one oath are set up at a timing that is not synchronized with requests for access.

7. In a database load distribution processing for distributing access to a distributed database managed by a plurality of servers from a client computer, a database load distribution processing device comprising:

a communication status management process module periodically monitoring failure, load, and activity status of communication resources and managing communication status by said client computer, independent of an access request;

a reading and comparison module reading the communication status and comparing a preceding communication status with a current communication status by said client computer, before receiving an access request;

a server status management process module periodically monitoring failure, load, and activity status of servers and managing server status by said client computer, independent of an access request; and a distributing function path selection management process module determining, by said client computers, at least one path to be used to access to said distributed database to perform a transaction processing based on failures, load and activity status for said communication resources, failures, load and activity status for said servers and a result of the comparison of the preceding and current communication statuses, independent of and before receiving an access request, wherein said distributing function path selection management process module sets up selection priorities of the at least one oath at a timing that is not synchronized with requests for access.

8. In a database load distribution processing device as described in claim 7, the database load distribution processing device further comprising:

an alternate path management process module determining a failed path if a failure takes place, setting up a path having the highest selection priority as an alternate path, and using said alternate path to perform a retry of a transaction processing that generated an error due to said failure.

9. In a database load distribution processing device as described in claim 8, a database load distribution processing device further comprising:

a path selection learning process module changing a number of paths being processed to a path number appropriate for a transaction volume, and recording transaction processing times for each path indicating processing times required by transaction processes, wherein said distributing function path selection management process module sets up selection priorities of the at least one path based on said communication status and said server status as well as information indicating said transaction processing time, and wherein said paths are indicated to said client computer based on said selection priority setting.

10. In a database load distribution processing device as described in claim 9, a database load distribution processing device wherein said path selection learning process module changes said path number based on a comparison of past transaction processing results and current transaction volume.

11. A recording medium holding a database load distribution processing program for distributing access load for a distributed database managed by a plurality of servers from a client computer, said database load distribution processing program when executed causes a computer to perform the steps of:

periodically monitoring communication resource failure, load, and activity status, and managing communication status by said client computer, independent of an access request;

reading the communication status and comparing a preceding communication status with a current communication status by said client computer, before receiving an access request;

periodically monitoring server failure, load, and activity status, and managing server status by said client computer, independent of an access request; and determining, by said client computer, at least one path to be used to access to said distributed database to perform transaction processing based on failures, load and activity status for said communication resources, failures, loads and activity status for said servers and a result of the comparison of the preceding and current communication statuses, independent of and before receiving an access request, wherein in said step of determining at least one path, selection of priorities for the at least one path are set up at a timing that is not synchronized with requests for access.

12. A recording medium holding a database load distribution processing program as described in claim 11, wherein said database load distribution processing program when executed further causes the computer to perform the steps of:

determining a failed path if a failure takes place;

setting up a path having a highest selection priority as an alternate path; and using said alternate path to retry a transaction processing for which an error was generated due to said failure.

13. In a recording medium holding a database load distribution processing program as described in claim 11, a recording medium holding a database load distribution processing program wherein said database load distribution processing program when executed further causes the computer to perform the steps of:

changing the number of paths being used for processing to a path number appropriate for a volume of transactions being processed; and recording transaction processing times for each of said paths, said processing times indicating processing times required for processing transactions, wherein said step of determining at least one path sets up selection priorities for said paths based on said activity status of communication resources, said activity status of servers, and information indicating transaction processing times.

* * * * *